No. 784,263. PATENTED MAR. 7, 1905.
J. J. HEYS.
STITCH INDENTING MACHINE.
APPLICATION FILED APR. 27, 1903.
4 SHEETS—SHEET 2.
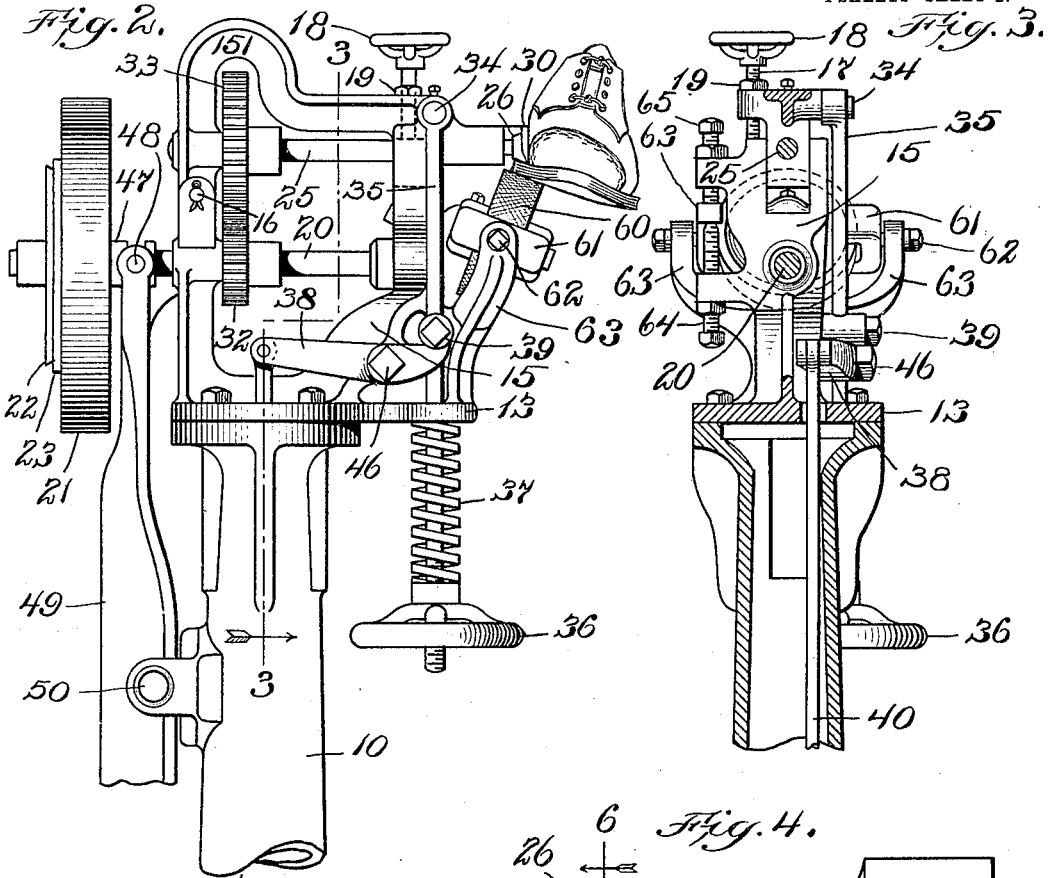
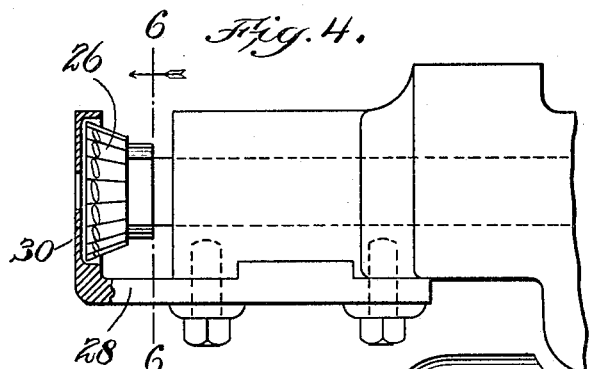
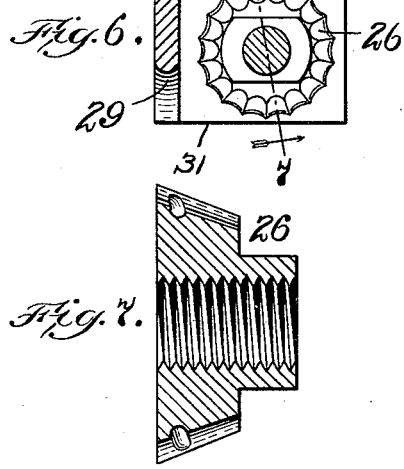
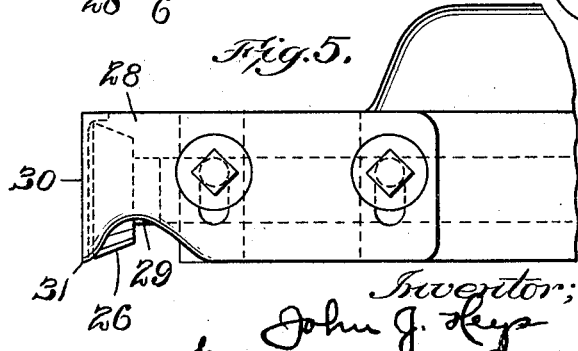
Witnesses:
Walter P. Ahrll.
P. W. Pezzetti.
Inventor;
John J. Heys
by Waugh & Brown Dunlop
his atty

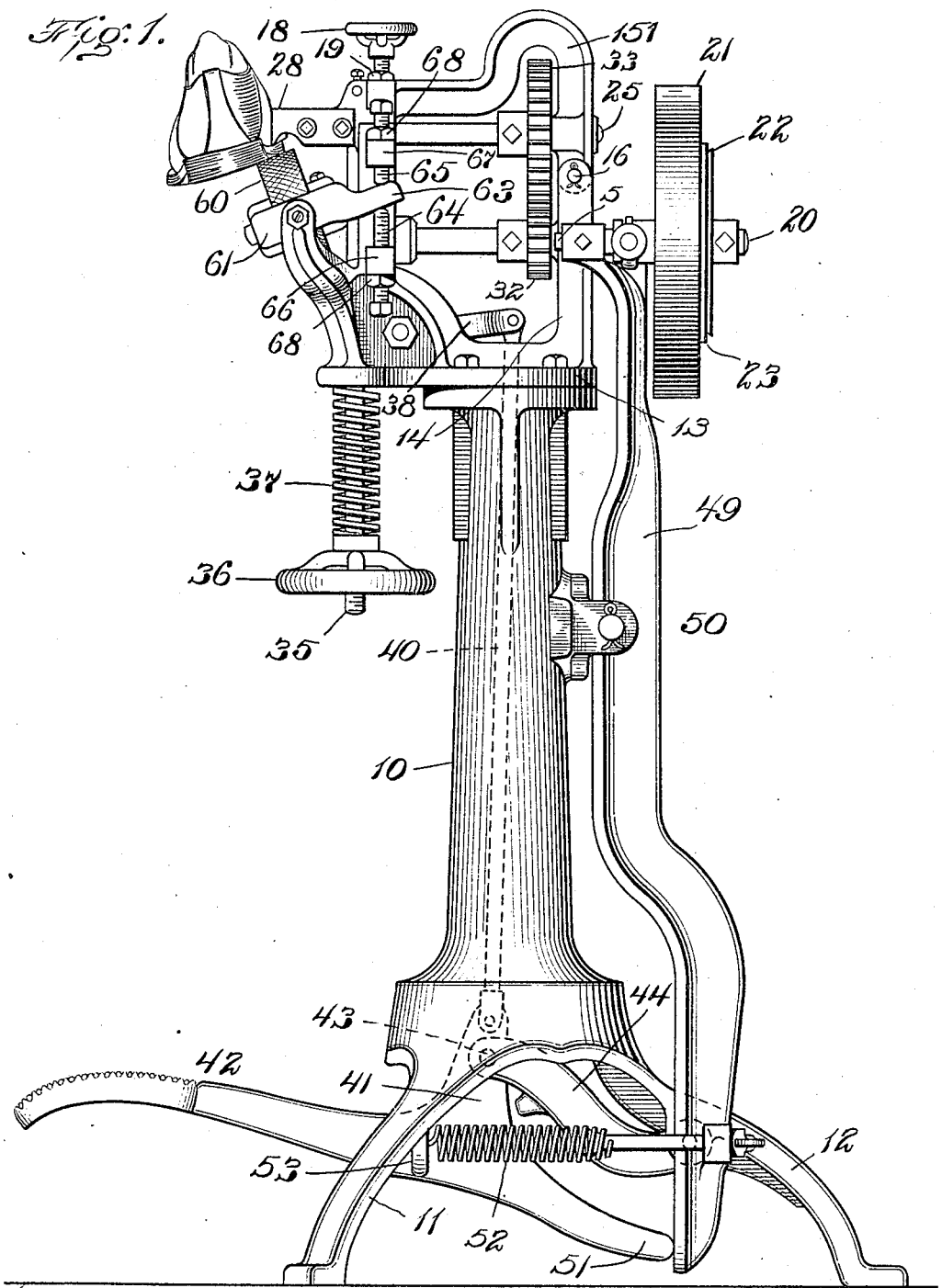

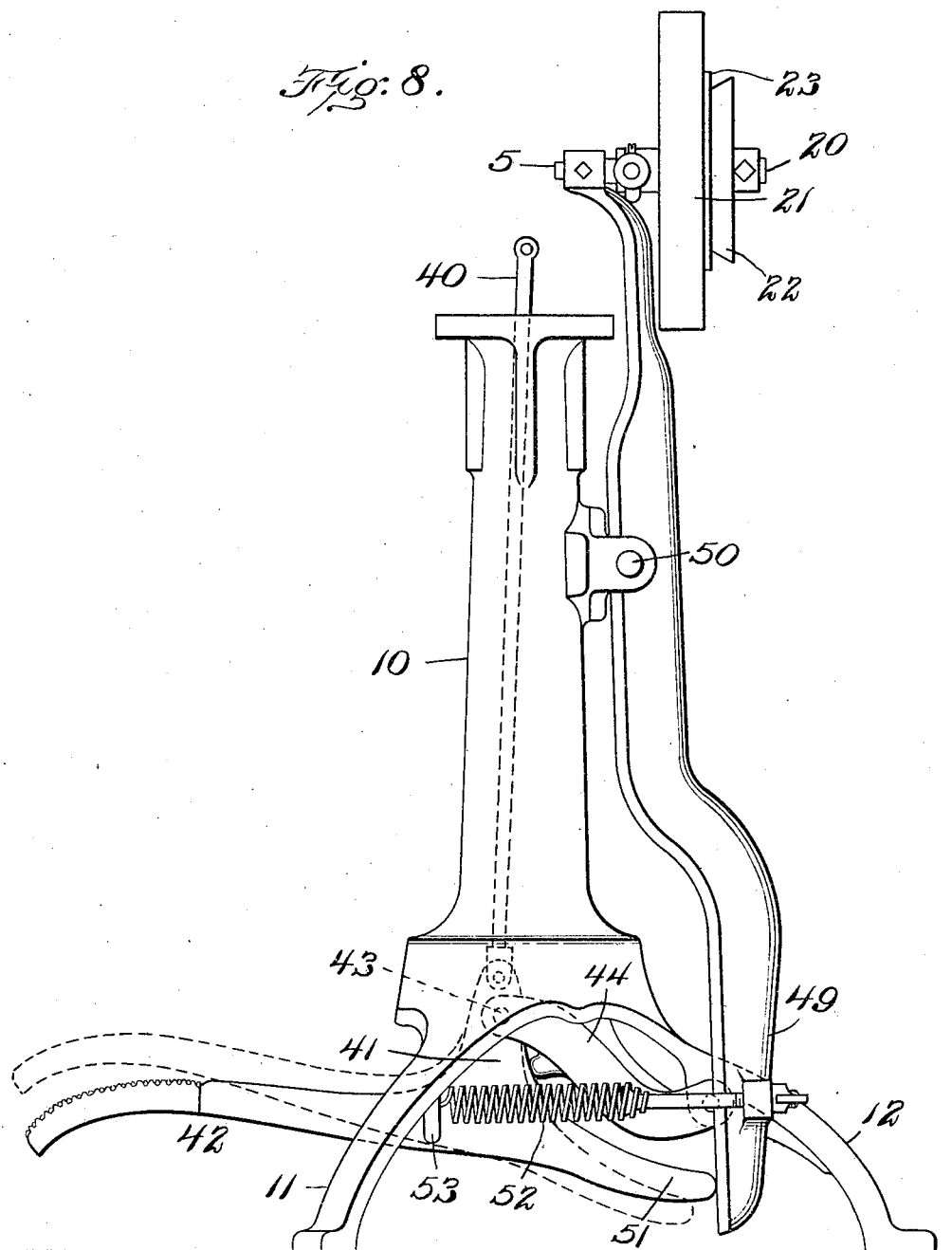

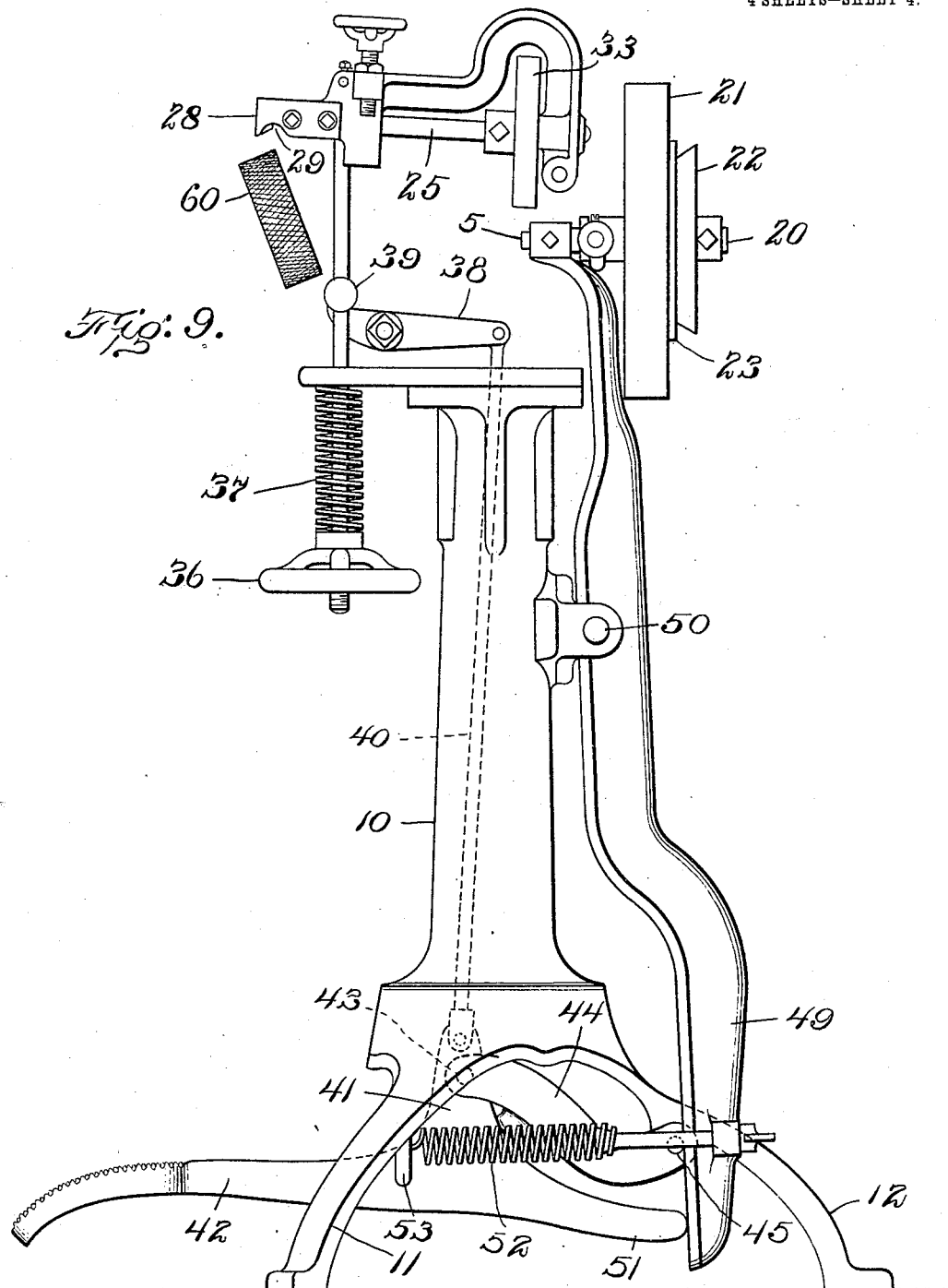

No. 784,263. Patented March 7, 1905.

UNITED STATES PATENT OFFICE.

JOHN J. HEYS, OF LYNN, MASSACHUSETTS, ASSIGNOR OF ONE-HALF TO MAURICE V. BRESNAHAN, OF LYNN, MASSACHUSETTS.

STITCH-INDENTING MACHINE.

SPECIFICATION forming part of Letters Patent No. 784,263, dated March 7, 1905.

Application filed April 27, 1903. Serial No. 154,383.

*To all whom it may concern:*

Be it known that I, JOHN J. HEYS, of Lynn, in the county of Essex and State of Massachusetts, have invented certain new and useful Improvements in Stitch-Indenting Machines, of which the following is a specification.

This invention has relation to power-machines, and its objects are manifold.

Primarily, the object of the invention is to provide certain improvements in that class of machines comprising a movable tool-carrying head and power-driven mechanism by means of which the application of power may be more readily controlled and the actuation of the head made simultaneous with the clutching or unclutching of the power-transmitting mechanism to the operating parts of the machine.

Secondarily, the invention has for its object to provide certain improvements in indenting or analogous machines for rendering them more efficient in operation and simpler and more durable in construction.

Referring to the accompanying drawings, Figure 1 represents in side elevation a machine embodying the invention. Fig. 2 represents an elevation from the other side. Fig. 3 represents a section on the line 3 3 of Fig. 2 looking in the direction of the arrow. Fig. 4 represents an enlarged plan view of the tool. Fig. 5 represents a side elevation of the same. Fig. 6 represents a section on the line 6 6 of Fig. 4. Fig. 7 represents an enlarged section on the line 7 7 of Fig. 6. Fig. 8 represents the mechanism for controlling the clutch devices. Fig. 9 represents the same mechanism with the addition of the mechanism for controlling the movable head.

For convenience the invention is illustrated as embodied in a stitch-indenting machine; but it will be understood that so far as the general features of the invention are concerned they may be as readily embodied in other forms of the machine and that the terms which are employed are for the purpose of description and not of limitation.

On the drawings a machine is shown as being provided with a tubular standard or base 10, supported by legs 11 11 12, arranged in tripodal form. On the top of the standard is placed a frame comprising a base 13, which is extended forwardly, and two uprights 14 15. In ears or lugs projecting upwardly from the uprights 14 there is a movable head 151, said head having the conformation illustrated in Figs. 1, 2, and 3. This head is utilized for carrying the operating-tool. The pivot upon which it is supported is indicated at 16. The front end of the head 151 is arranged in a guideway formed by slotting the upper end of the upright 15, as shown in Fig. 3, and it is supported by an adjustable screw 17, passed downwardly through a lug on one side of the end of the head 151 and resting upon the top of the upright 15. The said screw is provided with a hand-wheel 18, by means of which it may be more easily rotated, and is locked in position by a lock-nut 19.

In the frame is journaled a power-shaft 20, from which power is transmitted to the operating-tool carried by the movable head. A pulley 21 is journaled loosely on the shaft 20 and is adapted to be moved into frictional engagement with the clutch member 22, rigidly secured to the shaft. For coaction with the clutch member 22 there is a complemental member 23, connected to or forming a part of the pulley 21; but it will be understood that any other clutching mechanism may be employed in lieu of that shown. Moreover, the clutch member may be splined to and axially movable on the shaft, as commonly the case with machines of this character.

Mounted in the movable head 15 is a shaft 25, which projects beyond the end of the head and is provided with a suitable operating-tool. That form of tool illustrated in Figs. 4 to 7, inclusive, is more particularly adapted for indenting soles. It is indicated at 26 and is provided with a plurality of indenting edges or teeth. The tool is substantially in the form of a frusto-cone with the base out, so that the teeth converge toward a common center coincident with the axis of the shaft 25. The tool is partially inclosed by an angular guard 28, which is cutaway, as at 29, to expose the operative portion of the tool. The end face 30 of the guard forms a gage to bear against the upper of the shoe, while the lower edge 31 bears against the projecting edge of the sole, which is indented by the tool. The shaft 25 is actuated from the shaft 20 by means of the pinion 32 and the gear 33, and by reason of the pivotal connection of the head with the frame the head may be moved upwardly a limited extent to carry with it the shaft 25 and the tool 26 without the gears 32 33 becoming unmeshed.

Connected to the head by a stud 34 is a rod 35, (see Fig. 2,) which extends downwardly loosely through the base 13 of the frame and which is threaded at its lower end to receive a nut having a hand-wheel 36 formed on or secured thereto. Between the nut and the base 13 is a spring 37, so that the rod 35 and movable head are both held yieldingly downward, whereby the set-screw 17 normally rests upon the top of the standard 15, as described. For the purpose of lifting the rod 35, so as to raise the head, and thereby the tool, for the insertion of the work under the latter there is pivoted upon the frame a lever 38, whose front end projects under the stud 39 on the rod 35. The rear end of the lever is connected by a rod 48 with an arm 41 on a treadle 42, projecting forward from the machine between the legs 11, as best shown in Fig. 9. The arm 41 of the treadle 42 is pivotally connected by a stud 43 with a link 44, pivoted at its end upon a stud 45, secured in the ear or lug on the leg 12. When the treadle 42 is depressed, the lever 38 is rocked about its pivot 46, so as to lift the rod 35 and with it the head and the tool.

Reference has been hereinbefore made to the pulley 21 and the clutch member 22. This clutch is operated by the treadle 42, as follows: The hub 47 of the pulley is circumferentially grooved to receive the stud 48 on the bifurcated end of a lever 49, fulcrumed upon a stud 50 on the standard 10 and having its lower portion in engagement with the end of an arm 51, which is substantially a continuation of the treadle 42. A spring 52 connects the lower end of the lever 49 with a projection 53 on the tripodal base of the standard. Consequently when the treadle 42 is depressed the link 44 swings downward upon its pivot 45 and the arm 51 of the treadle forces the lower end of the lever 49 rearward against the tension of the spring 52, so as to force the upper end of said lever 49 to the right in Fig. 2 and to the left in Figs. 8 and 9, so as to unclutch the pulley 21 and the clutch member 23 from the clutch member 22. The upper end of the lever 49 is forked, as has been stated, and one of its forks, as shown in Fig. 1, carries an automatic stopping device consisting of a friction member 5, which upon the depression of the treadle comes into frictional engagement with the face of the gear 32, so as to immediately stop its rotation. Therefore when the treadle is depressed the shaft 20 is unclutched from the pulley, the shaft is stopped from rotation, and at the same time the movable head which carries the tool is raised. When the treadle is released, the head drops to position under the tension of the springs 27 52 (the spring 52 having returned the lever 49 to normal position) and the pulley is clutched to the shaft, whereby the latter immediately rotates.

The work-support which coacts with the tool consists of a peripherally milled or roughened wheel 60. This is journaled in an oscillatory yoke 61, supported by trunnions 62 in diverging arms 63, formed on the upright 15. The yoke 61 has an arm 63, which projects into the space between the two oppositely-arranged screws 64 65, threaded into lugs 66 67 on the upright 15. Each screw has a lock-nut 68. By adjusting these two screws 64 65 vertically, either upward or downward, the yoke and the work-support 60 may be adjusted about the axis of the trunnion 62, so as to lie horizontally or else at an inclination to the horizontal, so as to vary the angularity of the support and the tools.

From this description of the machine it will be seen that the normal position of the various parts is that in which they are when operating on the work and that to move them to inoperative or abnormal position it is necessary to depress the treadle. This is in contradistinction to those machines in which it is necessary to depress the treadle in order to move the various devices to operative position and to hold them there. Consequently with a machine of this character the operator is not required to exert his muscular force when the machine is operating, and is therefore able to stand securely on both feet and be thereby saved from unnecessary fatigue.

Having thus explained the nature of the invention and described a way of constructing and using the same, although without attempting to describe all of the forms in which it may be made or all the modes of its use, I declare that what I claim is—

1. A machine comprising a movable head provided with a rotary instrumentality to engage the work, a shaft connected to said instrumentality to rotate it, a power-shaft, clutch mechanism on said shaft, driving connection between said shafts, and means for simultaneously moving said head to inactive position and operating the clutch to stop the rotation of said instrumentality.

2. A machine comprising a rotary tool, movable means for supporting the tool, a shaft connected to the tool, clutch mechanism governing the rotation of the tool, and mechanism for automatically moving said supporting means to inactive position and operating said clutch to effect a cessation of rotation of the tool.

3. A machine comprising a driving-shaft, a driven shaft, driving connection between said shafts, clutch mechanism on said driving-shaft, a movable head, a rotary tool on said head adapted to be actuated by said driven shaft, and a treadle mechanism for simultaneously moving said head to inactive position and actuating the clutch to disconnect it from the driving-shaft.

4. A machine of the character described, comprising a stationary work-support, a movable head having a rotary tool thereon adapted to coact with said work-support in operating upon the work, a shaft connected to said rotary tool, clutch mechanism on the shaft, and means for simultaneously moving said head away from the work-support and unclutching said clutch from the shaft to stop the rotation of said tool.

5. A machine comprising a rotary tool, a movable head therefor, a shaft connected to said tool and having clutch mechanism thereon, and means for simultaneously unclutching the clutch mechanism from the shaft to stop the rotation of said tool and moving the said head toward inoperative position.

6. A machine of the character described, comprising a movable head carrying a rotary shaft with a tool thereon, a relatively stationary power-shaft geared to the first-mentioned shaft, a clutch on the power-shaft, and manually-operatable means for simultaneously unclutching said clutch from said shaft and moving said head to inactive position.

7. A machine of the character described, comprising in combination with a relatively stationary work-support, a power-shaft having a clutch thereon, a frame supporting said work-support and the said power-shaft, a head pivoted to said frame and carrying a tool at its free end, mechanism driven by said power-shaft for operating said tool, a depressible treadle, and means whereby the depression of said treadle moves said head to carry the tool away from said work-support.

8. A machine of the character described, in combination with a relatively stationary work-support, a power-shaft having a clutch thereon, a frame supporting said work-support and the said power-shaft, a head pivoted to said frame and carrying a tool at its free end, mechanism driven by said power-shaft for operating said tool, a depressible treadle, and means whereby the depression of said treadle unclutches the clutch from said shaft to arrest the operation of said tool and moves said head away from the work-support.

9. A machine of the character described comprising instrumentalities for operating on the work, including a power-shaft, clutch mechanism normally clutched on said shaft, a yieldingly-supported treadle having an arm thereon, and a lever fulcrumed between its ends and having one end connected with the clutch mechanism and its other end bearing against the end of the arm on the treadle, so that the depressing of said treadle effects the releasing of said shaft from said clutch.

10. A machine of the character described, comprising instrumentalities for operating upon the work including a movable head, a lever connected to said head, a rod connected to said lever, a spring for holding said head normally in operative position, a treadle between the ends of which said rod is connected, a movable fulcrum to which the treadle is pivoted between its ends, and an abutment for the end of said treadle.

11. A stitch-indenting machine comprising a rotary shaft having a rotary toothed indenting-tool thereon and a work-support consisting of a wheel or roller, a yoke in which said wheel or roller is journaled, trunnions for said yoke arranged at right angles to the axis of the roller, and means for adjusting said yoke about its trunnions to vary the angularity of the periphery of the wheel or roll and the indenting-tool.

In testimony whereof I have affixed my signature in presence of two witnesses.

JOHN J. HEYS.

Witnesses:
M. B. MAY,
P. W. PEZZETTI.